March 24, 1953 — E. NIGG — 2,632,271
DISPLAY DEVICE
Filed March 16, 1949
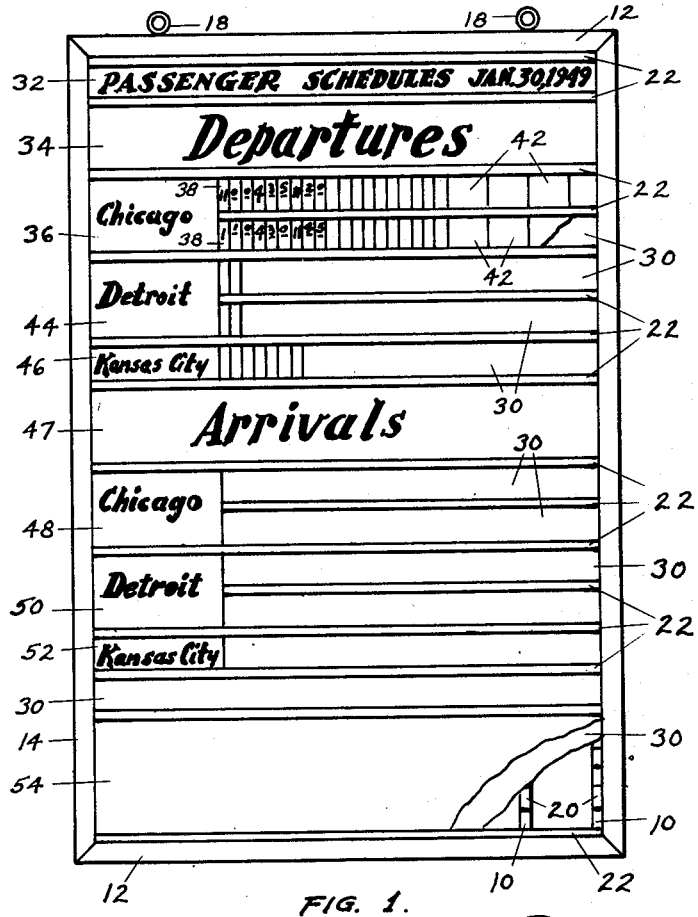
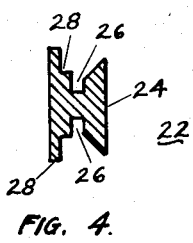
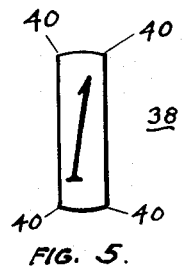
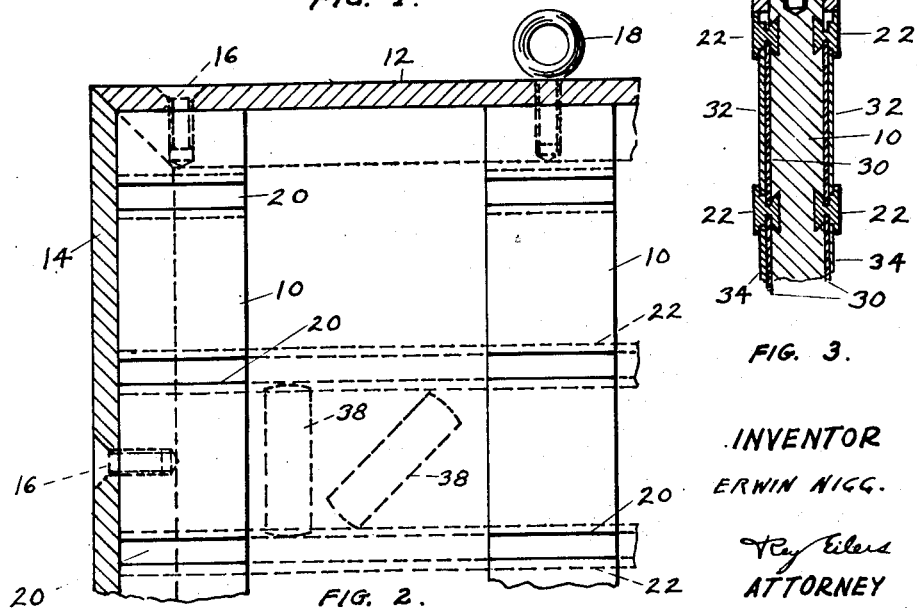
INVENTOR
ERWIN NIGG
ATTORNEY Patented Mar. 24, 1953

2,632,271

UNITED STATES PATENT OFFICE 2,632,271

DISPLAY DEVICE

Erwin Nigg, Bern, Switzerland, assignor to Ernest F. Gygax, St. Louis, Mo.

Application March 16, 1949, Serial No. 81,728

8 Claims. (Cl. 40—140)

This invention relates to improvements in display devices. More particularly, this invention relates to improvements in display devices which utilize replaceable indicia-bearing plates.

It is therefore an object of the present invention to provide an improved display device which utilizes replaceable indicia-bearing plates.

In many businesses it would be desirable to be able to post helpful information in neat and attractive fashion where it could be readily reviewed by interested persons, and to be able to change that information from time to time. For example, it would be desirable in the railroad business to be able to neatly and attractively post the scheduled times of arrival and departure of trains coming from and going to various cities and towns, and to be able to change the posting of those times as the schedules are revised. Similarly, it would be desirable in the airline, bus line, and shipping businesses to be able to neatly and attractively post the scheduled times of arrival and departure of planes, busses, and ships coming from and going to various cities and towns, and to be able to change the posting of those times as the schedules are revised. It would also be desirable, in cafeterias, diners, and other eating places to be able to neatly and attractively post the names of available items and the current prices of those items, and to be able to change the names and prices from time to time. In grocery, liquor, and other stores too it would be desirable to neatly and attractively post the names and prices of available items, and to be able to change those names and prices. Again, it would be desirable to be able to neatly and attractively list the names and room numbers of tenants in a building, and to be able to change those names and numbers from time to time.

In many instances attempts have been made to effect neat and attractive posting of information in such a way as to permit ready changing of that information, but those attempts have not been completely satisfactory. For example, cut-out letters and numerals have been provided with rearwardly extending projections that could be pressed into slots between resilient cushions on a supporting panel. Even if the letters and numerals did not become bent, did not fall out of position, or did not tilt forwardly or to the side, those letters and numerals would be hard to read because of the effect which the slots behind those letters and numerals would have upon the vision of the viewer. When however, the letters or numerals became bent, fell out of position, or tilted forwardly or to one side, as they did all too frequently, the effect of the display was seriously impaired. This impairment makes the use of such display devices objectionable. The present invention obviates this objection by providing a display device with spaced guides that receive and hold a number of indicia-bearing plates. The guides will closely confine all of the indicia-bearing plates within the same plane and will keep those plates from tilting or falling out of position. It is therefore an object of the present invention to provide a display device with spaced guides that receive and hold a number of indicia-bearing plates within the same plane.

In some instances letters, numerals and other indicia have been imprinted upon sheets of cardboard and those sheets inserted behind and held by spaced guide strips. The sheets of cardboard were inserted behind the guide strips either by flexing the sheets and inserting first the top edge and then the bottom edge behind the strips, or by aligning the sheets with the guide strips while holding those sheets at one side of the strips and then telescoping the top and bottom edges of those sheets behind those strips. Where the sheets were flexed while being inserted behind the guide strips, they sometimes flexed and fell out of position; and where the sheets were telescoped behind the guides, the replacement of one sheet entailed the removal and replacement of all the sheets between that one sheet and the ends of the guide strips. Similarly, where individual letters and numerals have been telescoped into position behind spaced guide strips, the replacement of one of those letters or numerals required the removal and replacement of all letters and numerals between the replaced letter or numeral and the ends of the guides. This need of removing and replacing a large number of cardboard sheets or individual letters and numerals just to remove, replace, or add an individual letter or numeral makes the use of such display devices objectionable since it requires excessive expenditures of time in making the changes and it makes the loss or bending of some of the sheets, letters, or numerals almost a certainty. The present invention obviates these objections by providing a display device which has indicia-bearing plates that can be removably inserted between guides without necessitating the removal of all plates between that plate and the ends of the guides. The present invention does this by cutting away the corners of the indicia-bearing plates; thus enabling those plates to be rotated in their own planes until their tops and bottoms are freed from the guides. Some space will be needed at the sides of a plate for that plate to rotate, but that space is quite small; and it is easily provided by temporarily removing one or two spacers or indicia-bearing plates from the guides and then shifting the remaining plates away from that plate which is to be replaced. Once that particular plate has been replaced the other plates can be moved into close engagement with each other, and then temporarily removed spacers or plates can be replaced. It is therefore an object of the present invention to provide a display device which has spaced guides and has indicia-bearing plates with cut-away corners.

The cutting away of the corners of the indicia-bearing plates will be done in such a way that those cut-away corners will be overlain and concealed by the guide strips when those plates are in normal position. As a result, the display device will have a neat and attractive appearance and yet the indicia-bearing plates can easily be removed and replaced. It is therefore an object of the present invention to cut away the corners of the indicia-bearing plates, for a display device, in such a way that the plates can be rotated into and out of holding engagement with spaced guides and so the cut-away corners of the plates will be overlain and concealed by the guides.

The spaced guides of the present invention are removably secured to the supporting structure of the display device. By being removable, those guides can be set at different positions on the display device to accommodate indicia-bearing plates of different sizes. This arrangement makes the display device quite versatile, and enables it to satisfy the needs of many different businesses. It is therefore an object of the present invention to provide a display device with removable guides that can be set at different places on the supporting structure of the display device to support plates of different sizes.

The display device of the present invention is provided with removable side frames; and those side frames engage the indicia-bearing plates and the guides of the display device and hold them in assembled relation with that device. However, separation of those side frames from the display device is easily effected, and it permits ready removal of those plates and guides from the display device. In this way, the side frames maintain the integrity of the display device while permitting removal and replacement of the plates and guides. It is therefore an object of the present invention to provide a display device with side frames that releasably engage and hold the plates and guides.

Other and further objects and advantages of the present invention should become apparent from an examination of the drawing and accompanying description.

In the drawing and accompanying description, a preferred embodiment of the present invention is shown and described, but it is to be understood that the drawing and accompanying description are for the purposes of illustration only and do not limit the invention and that the invention will be defined by the appended claims.

In the drawing,

Fig. 1 is a front elevational view of a display device that is made in accordance with the principles and teachings of the present invention, Fig. 2 is a partially sectioned, front view of a portion of the display device shown in Fig. 1, and it shows the confining elements and the removable plates of that device in dotted lines, Fig. 3 is a cross-sectional, end view of a portion of the display device shown in Figs. 1 and 2, Fig. 4 is a cross-sectional end view of one of the confining elements of the display device of Figs. 1–3, and Fig. 5 is a front elevational view of one of the removable indicia-bearing plates of the display device of Figs. 1–3.

Referring to the drawing in detail, the numeral 10 denotes longitudinally-disposed bars which are spaced apart along the width of the display device, and which have their upper and lower ends defining two parallel lines. Transversely-disposed end frames 12 of U-shaped cross section, extend along and enclose the upper and lower ends of each of the bars 10; and those end frames closely fit over and confine the upper and lower ends of the bars 10, as shown particularly in Fig. 3. Longitudinally-disposed side frame 14, of U-shaped cross section, are disposed at each side of the display device, and those side frames fit over and enclose the outer edges of the outermost bars 10. The abutting faces of side frames 14 and end frames 12 are mitered; thus they provide neat fitting corners for the display device. The end frames 12 are secured to the ends of each of the longitudinally-disposed bars 10 by flush-headed machine screws 16 or by screw eyes 18, and the side frames 14 are secured to the two outermost bars 10 by a number of flush-headed machine screws 16.

Each of the bars 10 is provided with a number of equally-spaced, transversely-extending dovetail slots 20; the slots 20 in each bar 10 being in register with the slots 20 in every other bar. The slots 20 in the various bars 10 of the display device coact to constitute a number of discontinuous straight slots extending transversely of the display device. As shown particularly in Fig. 3, the bars 10 of the display device can have dovetail slots 20 in the front and rear faces thereof; it of course being obvious that if desired, the bars 10 of the display device can be made with dovetail slots in only one or the other of the faces thereof. The longitudinally-extending bars 10, the end frames 12 and the side frames 14 cooperate to provide a sturdy, light-weight supporting structure for the display device. In those instances where weight and material costs are not prominent factors, the supporting structure of the display device could be made by forming the dovetailed slots in a solid plate of metal.

The dovetail slots 20 in the bars 10 can releasably receive and hold confining elements 22; each of the confining elements 22 having a dovetailed foot 24, deep grooves 26 and shallow grooves 28. The dovetailed feet 24 of the confining elements 22 are dimensioned to fit within and be held by the slots 20; the dovetailed feet 24 being capable of being separated from the slots 20 when desired. In the display device shown in the drawing, confining elements 22 are not disposed within all of the slots 20 in bars 10; the third, tenth, nineteenth and twentieth slots 20 in each bar 10 being empty.

The confronting grooves 26 of the confining elements 22 receive and hold thin backing plates 30; which plates overlie the bars 10 and the spaces therebetween. Several of those backing plates 30 will be just wide enough to span the distance between confronting grooves 26 in confining elements 22 which are set in immediately adjacent slots 20. However, two of those backing plates 30 are twice that wide; one of those plates extending between the confronting grooves 26 in the confining elements 22 which are set in the second and fourth slots 20, and the other of those plates extending between the confronting grooves 26 in the confining elements 22 which are set in the ninth and eleventh slots 20. Another of the backing plates 30 is three times the width of a normal backing plate 30; that plate extending between the confronting grooves 26 in the confining elements 22 which are set in the eighteenth and twenty-third slots 20.

The confronting grooves 28 of the confining elements 22 will receive and hold thin plates that either bear indicia or are left blank and serve as spacers. One such plate is denoted by the numeral 32; and that plate extends between the confronting grooves 28 of the confining elements 22 which are set in the first and second slots 20. Imprinted on plate 32 is a statement designative of the information afforded by the display device; in this instance, the departure and arrival of passenger trains. If desired, the statement imprinted on the plate 32 could be imprinted directly on the backing plate 30 held by the grooves 26 in the confining elements 22 that are set in the first and second slots 20; in such a case the plate 32 would be unnecessary and could be dispensed with. A plate 34 extends between the confronting grooves 28 in the confining elements 22 that are set in the second and fourth slots; and imprinted on that plate is a statement which is a sub-heading of the statement on the plate 32. In the case of plate 34, as in the case of plate 32, the indicia could be imprinted directly on the backing plates 30 and the plate 34 eliminated. A plate 36 extends between the confronting grooves 28 in the confining elements 22 that are set in the fourth and sixth slots 20; but unlike plates 32 and 34, the plate 36 does not extend across the full width of the display device. Instead the plate 36, and the backing plate 30 for that plate, engage the left hand side frame 14 and extend across only a part of the width of the display device; the right hand edges of both of those plates abutting the left hand end of the confining element 22 set in the fifth slot 20, and the right hand edge of that backing plate abutting the left hand edges of the backing plates 30 which are held by the grooves 26 in the confining elements 22 that are set in the fourth and fifth and the fifth and sixth slots 20 respectively. The right hand edge of the plate 36 will abut narrow plates 38 which bear indicia thereon. These plates, and other plates 38 which either bear indicia or are left blank, extend into and are supported by the grooves 28 in the confining elements 22 that are set in the fourth and fifth and fifth and sixth slots 20 respectively.

The plates 38 are provided with cut-away corners 40, and those corners are preferably rounded to make the tops and bottoms of the plates 38 smoothly arcuate. Those corners 40 also are preferably made so the maximum straight-line distance in each plate 38 is its height and so every other straight-line surface distance, including diagonals, is less than or equal to that height. In addition, the corners 40 are made so the length of each side of each of the plates 38 is greater than the distance between confronting edges of adjacent confining elements 22. With this arrangement, the confining elements 22 will overlie, confine, and conceal the tops and bottoms of the plates 38 and will overlie and conceal the cut-away corners 40 of those plates 38, while permitting the plates 38 to be rotated from their longitudinally-disposed positions wherein they are held by the confining element 22 to inclined positions wherein the confining elements 22 do not overlie those plates. This enables the plates 38 to be inserted behind and held by the confining elements 22 without requiring those plates to be moved adjacent the ends of the confining elements 22, aligned with the grooves 28 in those elements, and then telescoped along within those grooves until they reach the desired position. Instead, the plates 38 can be rotated to an inclined position, as indicated in Fig. 2, pressed against backing plate 30, rotated into longitudinally-disposed position with their tops and bottoms within grooves 28 and underlying the confining elements 22, and then given a final adjustment by moving them adjacent another plate 38.

In those instances where a considerable amount of information is to be provided in regard to the subject described by the indicia on plate 36, plates 38 will lie side by side and will extend from the right hand edge of plate 36 to the right hand side frame 14. In those instances where a lesser amount of information is to be provided, one or more wide spacers 42 can be substituted for the plates 38. A number of these wide spacers are shown between the confining elements which are set in the fourth and fifth and the fifth and sixth slots 20 respectively.

A plate 44, similar to the plate 36, is held by the grooves 28 in the confining elements 22 which are set in the sixth and eighth slots 20. The plate 44 is narrower than the display device; and that plate and its backing plate 30 extend between the left hand side frame 14 and the left hand end of the confining element 22 which is set in the seventh slot 20. Two backing plates 30 extend between the right hand edge of plate 44 and the right hand side frame 14. Although no indicia-bearing and blank plates 38 are shown overlying those backing plates 30, such plates will be provided to indicate the scheduled departure of trains for the city of Detroit.

A backing plate 30 is held between the grooves 26 in the confining elements 22 that are held in the eighth and ninth slots 20. Overlying the left hand side of this particular backing plate 30 is a plate 46; which plate is held by the confronting grooves 28 of those particular confining elements 22. The right hand side of this particular backing plate 30 is partially overlain by a number of blank plates 38; but in practice a number of plates 38 with indicia thereon will be used.

A plate 47 extends between the grooves 28 in the confining elements 22 which are set in the ninth and eleventh slots 20, and imprinted on that plate is a statement which is a sub-heading of the statement on the plate 32. As in the cases of plates 32 and 34, the information on plate 47 could be imprinted directly upon the backing plate 30 held by the confining elements 22 which are set in the ninth and eleventh slots 20; and in such case the plate 47 could be dispensed with.

Plates 48 and 50 are held by the confronting grooves 28 in the confining elements 22 which are set in the eleventh and thirteenth and the thirteenth and fifteenth slots 20. These plates are similar to the plates 36 and 44; and the spaces between the right hand edges of plates 48 and 50 and the right hand side frame 14 are occupied by confining elements 22 and backing plates 38. Plates 38 and spacers 42 being capable of being inserted between and held by those confining elements.

Backing plates 30 are disposed between the confronting slots 26 in the confining elements 22 which are set in the fifteenth and sixteenth, the sixteenth and seventeenth, and the seventeenth and eighteenth slots 20. A plate 52 overlies the left hand side of the backing plate 30 between the confining elements 22 which are set in the fifteenth and sixteenth slots 20; and similar plates could be used to overlie the left hand sides of the other two backing plates 30. Plates 39 and spacers 42 could also be held by the slots 28 in those confining elements 22.

A large plate 54 is held by the confronting grooves 28 in the confining elements 22 which are set in the eighteenth and twenty-third slots 20. This large plate can be imprinted with additional information relating to the operation of the trains, or it can be imprinted with advertising or other matter. Moreover, this plate could be eliminated and the desired information imprinted directly upon the backing plate 30 under the plate.

Separation of the plate 38 from the display device is easily effected by loosening the screws 16 that hold the right hand side frame 14 to the right hand bar 10 of the display device and then removing that side frame. Thereafter, three of the spacers 38 or one of the spacers 42 can be removed from between the confining elements 22 which hold the particular plate 38 to be removed, the rest of the plates 38 and spacers 42 can be shifted to the right to leave a space adjacent the designated spacer, and that plate can then be grasped and rotated until it assumes the inclined position shown in Fig. 2. At such time the plate 38 is not overlain by either of the retaining elements 22, and it can easily be removed directly from the display device. In this way, any number of plates 38 can be assembled with or separated from the display device. Once the addition, removal, or substitution of the plates 38 has been effected, the three plates 38 or the spacer 42 is replaced, and the right hand side frame 14 is again secured to the right hand bar 10. The plates 36, 44, 46, 48, 50, and 52 are most conveniently removed and replaced by removing the left hand side frame 14. The confining elements 22 can be replaced by removing a side frame 14 and pulling the elements 22 out of the slots 20.

The bars 10, end frames 12, side frames 14, confining elements 22, backing plates 30, and the various plates 32, 34, 36, 38, 42, 44, 46, 47, 48, 50, 52, and 54 can be made of a number of different materials, but they are preferably made of aluminum. Moreover, the aluminum of which these various parts are made is preferably anodized. Where this is done, a light-weight, neat, and attractive display device is provided.

This display device can be used to display many different kinds of information, and that information can be changed quickly and easily. For example, by having extra confining elements 22, extra backing plates 30, and extra plates similar to plates 32, 34, 36 and the like, it is possible to place a confining element 22 in every slot 22 or in only a few of those slots. Moreover, it is possible to have those plates extend across all or just a part of the width of the display device. Where the plates extend across only a part of the width of the display device, it is desirable that the inner edges of those plates overlie a bar 10. This provides full backing for every part of the display device.

Whereas a preferred embodiment of the present invention has been shown and described in the drawing and accompanying description it should be obvious to those skilled in the art that various changes can be made in the form of the invention without affecting the scope thereof.

What I claim is:

1. A display device that comprises a plurality of spaced confining elements and a plurality of indicia-bearing plates, said indicia-bearing plates having cut-away corners, said indicia-bearing plates being dimensioned to engage and be held by said confining elements but also being adapted to be rotated relative to and freed from said confining elements, said corners of said plates being dimensioned so said confining elements overlie and conceal said corners, said plates normally abutting each other to prevent the rotation of any of said plates relative to said confining elements but being separable from each other to permit the rotation of selected ones of said plates relative to said confining elements to free said selected plates from said confining elements.

2. A display device that comprises a plurality of spaced confining elements and a plurality of indicia-bearing plates, said indicia-bearing plates having cut-away corners, said indicia-bearing plates being dimensioned to engage and be held by said confining elements but also being adapted to be rotated relative to and freed from said confining elements, said plates having arcuate tops and bottoms which are convex relative to the centers of said plates to define the said cut-away corners, said plates normally abutting each other to prevent the rotation of any of said plates relative to said confining elements but being separable from each other to permit the rotation of selected ones of said plates relative to said confining elements to free said selected plates from said confining elements.

3. A display device that comprises a plurality of spaced confining elements and a plurality of indicia-bearing plates, said indicia-bearing plates having cut-away corners, said indicia-bearing plates being dimensioned to engage and be held by said confining elements but also being adapted to be rotated relative to and freed from said confining elements, said confining elements providing confronting recesses therein, said plates being dimensioned so the height of each plate is greater than the distance between the bottom of the recess in one confining element and the edge of said other confining element and so every straight-line surface dimension of each of said plates is smaller than the distance between the bottoms of the recesses in said confining elements, said plates normally abutting each other to prevent the rotation of any of said plates relative to said confining elements but being separable from each other to permit the rotation of selected ones of said plates relative to said confining elements to free said selected plates from said confining elements.

4. A display device that comprises a plurality of spaced confining elements and a plurality of indicia-bearing plates, said indicia-bearing plates having cut-away corners, said indicia-bearing plates being dimensioned to engage and be held by said confining elements but also being adapted to be rotated relative to and freed from said confining elements, said corners of said indicia-bearing plates being arcuate and being convex relative to the centers of said plates, said plates normally abutting each other to prevent the rotation of any of said plates relative to said confining elements but being separable from each other to permit the rotation of selected ones of said plates relative to said confining elements to free said selected plates from said confining elements.

5. A display device that comprises a plurality of spaced confining elements and a plurality of indicia-bearing plates, said indicia-bearing plates having cut-away corners, said indicia-bearing plates being dimensioned to engage and be held by said confining elements but also being adapted to be rotated relative to and freed from said confining elements, said corners of said indicia-bearing plates being dimensioned so the height of each of said plates is the longest straight-line surface distance of said plate, said plates normally abutting each other to prevent the rotation of any of said plates relative to said confining elements but being separable from each other to permit the rotation of selected ones of said plates relative to said confining elements to free said selected plates from said confining elements.

6. A display device that comprises a plurality of spaced confining elements and a plurality of indicia-bearing plates, said indicia-bearing plates having cut-away corners, said indicia-bearing plates being dimensioned to engage and be held by said confining elements but also being adapted to be rotated relative to and freed from said confining elements, the tops and bottoms of said plates extending under and being overlaid, confined, and concealed by said confining elements, said plates normally abutting each other to prevent the rotation of any of said plates relative to said confining elements but being separable from each other to permit the rotation of selected ones of said plates relative to said confining elements to free said selected plates from said confining elements.

7. A display device that comprises a plurality of spaced confining elements and a plurality of indicia-bearing plates, said indicia-bearing plates having cut-away corners, said indicia-bearing plates being dimensioned to engage and be held by said confining elements but also being adapted to be rotated relative to and from said confining elements, the corners of said plates being dimensioned so the length of the edge of each of said plates extending across the space between confronting confining elements is greater than the distance between confronting edges of said confining elements, said plates normally abutting each other to prevent the rotation of any of said plates relative to said confining elements but being separable from each other to permit the rotation of selected ones of said plates relative to said confining elements to free said selected plates from said confining elements.

8. A display device that comprises a plurality of spaced confining elements and a plurality of indicia-bearing plates, said indicia-bearing plates having cut-away corners to permit rotation of said plates relative to said confining elements while said plates are held by said confining elements, said indicia-bearing plates being dimensioned to engage and be held by said confining elements but also being adapted to be rotated relative to and freed from said confining elements, said plates normally abutting each other to prevent the rotation of any of said plates relative to said confining elements but being separable from each other to permit the rotation of selected ones of said plates relative to said confining elements to free said selected plates from said confining elements.

ERWIN NIGG.

REFERENCES CITED

The following references are of record in the file of this patent:

UNITED STATES PATENTS

| Number | Name | Date |
|---|---|---|
| 791,903 | Hawkins | June 6, 1905 |